United States Patent
Gao (10) Patent No.: US 11,695,616 B2
(45) Date of Patent: Jul. 4, 2023

(54) MESSAGE PROCESSING METHOD AND APPARATUS, ELECTRONIC DEVICE AND COMPUTER-READABLE STORAGE MEDIUM

(71) Applicant: BEIJING XIAOMI MOBILE SOFTWARE CO., LTD., Beijing (CN)

(72) Inventor: Yi Gao, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 17/099,984

(22) Filed: Nov. 17, 2020

(65) Prior Publication Data

US 2021/0306202 A1 Sep. 30, 2021

(30) Foreign Application Priority Data

Mar. 26, 2020 (CN) .......................... 202010221851.4

(51) Int. Cl.
*H04W 8/18* (2009.01)
*H04L 41/0604* (2022.01)

(52) U.S. Cl.
CPC ........... *H04L 41/0604* (2013.01); *H04W 8/18* (2013.01)

(58) Field of Classification Search
CPC .............................. H04L 41/0604; H04W 8/18
USPC ....................................................... 455/418
See application file for complete search history.

(56) References Cited

U.S. PATENT DOCUMENTS

| | | | |
|---|---|---|---|
| 8,036,708 B2 * | 10/2011 | Oozeki | H04W 8/183 235/475 |
| 2011/0201327 A1 | 8/2011 | Kaul | |
| 2012/0246524 A1 | 9/2012 | Thomas et al. | |
| 2020/0366328 A1 * | 11/2020 | Park | G06K 7/00 |

FOREIGN PATENT DOCUMENTS

| | | |
|---|---|---|
| CN | 102098390 A | 6/2011 |
| CN | 102547665 A | 7/2012 |
| CN | 105338562 A | 2/2016 |
| CN | 106126231 A * | 11/2016 |
| CN | 105376113 B | 5/2018 |
| CN | 105338562 B | 9/2018 |

(Continued)

OTHER PUBLICATIONS

Extended European Search Report (EESR) in EP 21156448.9 dated Jul. 13, 2021.

(Continued)

*Primary Examiner* — Jirapon Tulop
(74) *Attorney, Agent, or Firm* — Syncoda LLC; Feng Ma (57) ABSTRACT

A message processing method, applied to a terminal device including a modem, includes: monitoring a running state of the modem, and restarting the modem when it is monitored that the modem crashes; and maintaining a communication connection state, and prohibiting notification of a modem crash message to a user. By maintaining a normal communication state after the modem crashes, it is ensured that the user continues to use the various services of the terminal normally to avoid the interruption of the ongoing business of the user; and the terminal resumes normal operation after the modem is restarted, and the user does not perceive that the modem has ever crashed, thereby maintaining the experience of using the terminal normally all the time.

16 Claims, 4 Drawing Sheets

(56) References Cited

FOREIGN PATENT DOCUMENTS

| CN | 109271187 A   | 1/2019  |
|----|---------------|---------|
| CN | 110187934 A   | 8/2019  |
| EP | 1924067 A1    | 5/2008  |
| WO | 2016168037 A1 | 10/2016 |
| WO | 2019151619 A1 | 8/2019  |

OTHER PUBLICATIONS

First Office Action for Chinese Patent Application No. 202010221851.4 dated Apr. 2, 2022.
China second office action in Application No. 202010221851.4, dated Sep. 7, 2022.
European Patent Office Action in Application No. 21156448.9, dated Feb. 20, 2023.

\* cited by examiner

MESSAGE PROCESSING METHOD AND APPARATUS, ELECTRONIC DEVICE AND COMPUTER-READABLE STORAGE MEDIUM

CROSS-REFERENCE TO RELATED APPLICATION

This application claims priority to Chinese Patent Application No. 202010221851.4 filed on Mar. 26, 2020, the disclosure of which is hereby incorporated by reference in its entirety.

BACKGROUND

In smart terminal devices based on 5G communications, a modulator-demodulator, i.e., a modem, may often crash due to the particularity of the 5G module and various problems of the 5G network. The modem crash information will be notified to various services through various ways, resulting in the unavailability of various communication connections and related services that require modem support in the terminal, such as interruption of calls and internet access, which seriously affects the user experience.

SUMMARY

The present disclosure generally relates to the field of terminal device system control, and more specifically, to a message processing method, a message processing apparatus, an electronic device and a computer-readable storage medium.

According to a first aspect of the present disclosure, there is provided a message processing method, which is applied to a terminal device including a modem, and the method includes: monitoring a running state of the modem, and restarting the modem when it is monitored that the modem crashes; and maintaining a communication connection state, and prohibiting notification of a modem crash message to a user.

In some embodiments, the maintaining a communication connection state, and prohibiting notification of a modem crash message to a user includes: monitoring a state of a SIM card, and prohibiting issuance of a SIM card abnormal message when it is monitored that the SIM card is abnormal.

In some embodiments, the state of the SIM card includes a state that the SIM card is in a card slot; and the prohibiting issuance of a SIM card abnormal message when it is monitored that the SIM card is abnormal includes: prohibiting record of a SIM card drop message and notification of the SIM card drop message to a status bar when it is monitored that the SIM card is dropped.

In some embodiments, the state of the SIM card includes a SIM card network state; and the prohibiting issuance of a SIM card abnormal message when it is monitored that the SIM card is abnormal includes: prohibiting notification of a message indicating that the SIM card is in the network but there is no service to a status bar when it is monitored that the SIM card is in the network but there is no service.

In some embodiments, the state of the SIM card includes a SIM card signal strength state; and the prohibiting issuance of a SIM card abnormal message when it is monitored that the SIM card is abnormal includes: prohibiting notification of an invalid signal strength message to a status bar when the invalid signal strength is monitored.

In some embodiments, the maintaining a communication connection state, and prohibiting notification of the modem crash message to a user includes: prohibiting prompt of the user being unable to make a call when the user makes a call.

In some embodiments, the method further includes: maintaining the call in a waiting state, not establishing a connection between the call and the modem, and enabling the call to establish a connection with the modem after the modem is restarted successfully.

In some embodiments, the maintaining a communication connection state, and prohibiting notification of the modem crash message to a user includes: maintaining a mobile data connection available state, and prohibiting issuance of a mobile data disconnection message.

In some embodiments, the method further includes: caching a data packet waiting to be uploaded through a mobile data connection, and uploading the data packet through the re-established mobile data connection after the modem is restarted successfully.

In some embodiments, the method further includes: determining whether the modem is restarted successfully after the modem crashes for a predetermined time, and notifying a user of the modem crash message if the modem fails to be restarted successfully.

According to a second aspect of the present disclosure, there is provided a message processing apparatus, which is applied to a terminal device including a modem, and the apparatus includes: a modem management unit configured to monitor a running state of the modem and restart the modem when it is monitored that the modem crashes; and a message management unit configured to maintain a communication connection state and prohibit notification of a modem crash message to a user.

In some embodiments, the message management unit includes: a SIM card message management unit configured to monitor a state of a SIM card, and prohibit issuance of a SIM card abnormal message when it is monitored that the SIM card is abnormal.

In some embodiments, the state of the SIM card includes a state that the SIM card is in a card slot; and the SIM card message management unit is configured to: prohibit record of a SIM card drop message and prohibit notification of the SIM card drop message to a status bar when it is monitored that the SIM card is dropped.

In some embodiments, the state of the SIM card includes a SIM card network state; and the SIM card message management unit is configured to: prohibit notification of a message indicating that the SIM card is in the network but there is no service to a status bar when it is monitored that the SIM card is in the network but there is no service.

In some embodiments, the state of the SIM card includes a SIM card signal strength state; and the SIM card message management unit is configured to: prohibit notification of an invalid signal strength message to a status bar when the invalid signal strength is monitored.

In some embodiments, the message management unit includes: a call message management unit configured to prohibit prompt of the user being unable to make a call when the user makes a call.

In some embodiments, the call message management unit is further configured to: maintain the call in a waiting state, not establish a connection between the call and the modem, and enable the call to establish a connection with the modem after the modem is restarted successfully.

In some embodiments, the message management unit includes: a mobile data connection message management unit configured to maintain a mobile data connection available state, and prohibit issuance of a mobile data disconnection message.

In some embodiments, the mobile data connection message management unit is further configured to: cache a data packet waiting to be uploaded through a mobile data connection, and upload the data packet through the re-established mobile data connection after the modem is restarted successfully.

In some embodiments, the message management unit is further configured to: determine whether the modem is restarted successfully after the modem crashes for a predetermined time, and notifying a user of the modem crash message if the modem fails to be restarted successfully.

According to a third aspect of the present disclosure, there is provided an electronic device, the electronic device includes: a memory device configured to store instructions; and a processor configured to invoke the instructions stored in the memory to execute the message processing method of the first aspect.

According to a fourth aspect of embodiments of the present disclosure, there is provided a computer-readable storage medium, on which instructions are stored, and when the instructions are executed by a processor, the message processing method of the first aspect is executed.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this disclosure, illustrate embodiments consistent with the present disclosure and, together with the description, serve to explain the principles of the present disclosure.

DETAILED DESCRIPTION

Description will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Users typically do not need to pay attention to a series of service states related to the modem at all times, and it does not affect the use of the terminal after the modem is restored. After notifying users of the message concerning the modem crash information through various ways, the users may have to interrupt the ongoing business and cannot continue to use the 5G mobile terminals normally, which leads to the problem of poor user experience.

Figure 1:
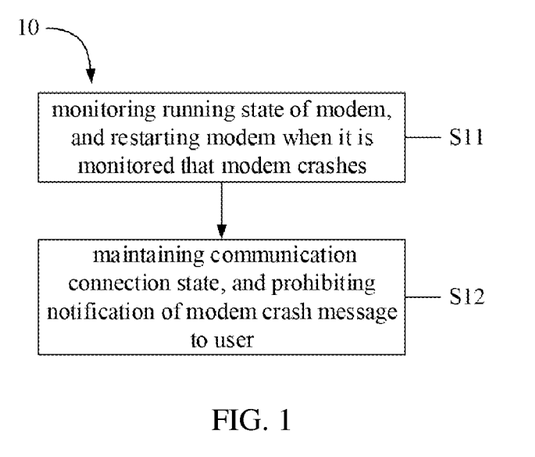
FIG. 1 is a schematic flowchart illustrating a message processing method according to some embodiments.

With reference to FIG. 1, various embodiments of the present disclosure provide a message processing method 10, which can be applied to terminal devices such as mobile phones and tablet computers etc., and the terminal device includes a modem, that is, a modulator-demodulator, to convert analog signal by communication transmission to digital signal transmitted to and received from the terminal, or vice versa, the modem crash will interrupt the terminal communication transmission, thereby affecting the operation of communication-related services and user experience. Thus, the message processing method 10 provided by the embodiments of the present disclosure, as shown in FIG. 1, includes step S11 to step S12:

In step S11, a running state of the modem is monitored, and the modem is restarted when it is monitored that the modem crashes.

The terminal obtains a real-time running state of modem by maintaining the monitoring of the modem. The monitoring way can be that the terminal operating system actively queries the state of the modem, such as heartbeat detection, and when a crash state has been queried or the state cannot be queried, it can be determined that the modem crashes; the monitoring way can also be that the terminal operating system passively receives the status notification sent from the modem, and when the crash state is received or the state is not received for a long time, it can be determined that the modem crashes; and the monitoring way can further be a combination of the above active and passive methods. The running state of the modem directly affects the communication service, and once the modem crashes, the related services will not be able to obtain external information or transmit the information, thus when it is monitored that the modem crashes, the modem is restarted to restore the normal operation of the modem, and various services of the terminal also return to normal.

In step 12, a communication connection state is maintained, and notification of the modem crash message to a user is prohibited.

In the related technologies, after the modem crashes, the communication connection will be interrupted, and the modem crash message will be fed back to various services and applications of the system through various forms, thereby resulting in that the service is interrupted, the connection between the application and the outside is interrupted, and the user also knows that the current communication connection is abnormal and has to interrupt the current job, and even if there is no ongoing job, the abnormal information will reduce the user experience of using the terminal, the frequent occurrence of the abnormal information will annoy the user and seriously affect the user experience.

In some embodiments of the present disclosure, after the modem crashes, the communication connection state before the modem crashes is still maintained, and it is forbidden to notify the user of the modem crash message, and the modem crash message is not issued. It takes less time to restart the modem, and the consumed time is less than one minute, usually a few seconds or more than ten seconds, thus even if the modem fails to work properly to provide a communication connection between the terminal and the outside during the modem crash time, it can ensure that the user services are temporarily available, without knowing the modem crash message, such that the user still has the same experience as the modem did not crash during the modem crash, which avoids the problem of the user service interruption and the decreased experience after the modem crashes in the related technologies.

Figure 2:
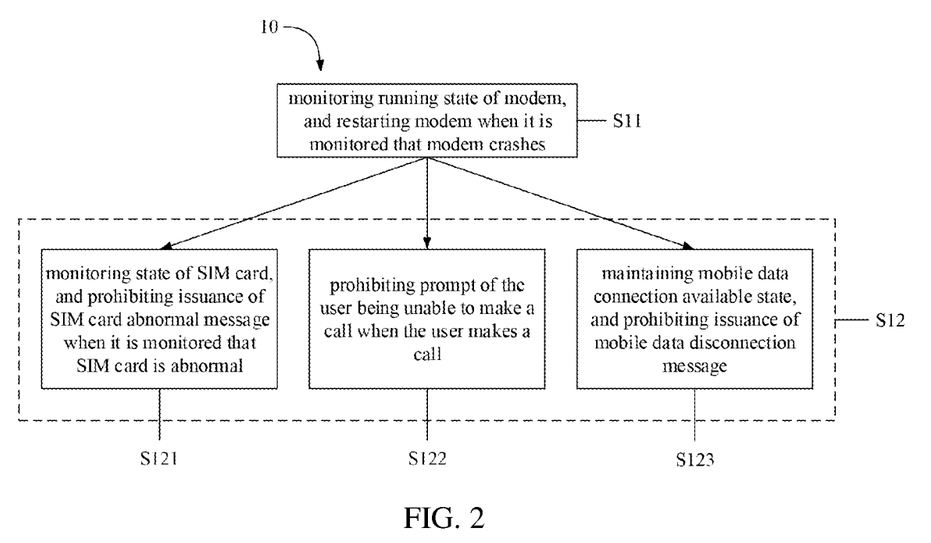
FIG. 2 is a schematic flowchart illustrating another message processing method according to some embodiments.

In some embodiments, as shown in FIG. 2, step S12 includes: step S121, monitoring a state of a SIM card, and prohibiting issuance of a SIM card abnormal message when it is monitored that the SIM card is abnormal.

In some embodiments, after the modem crashes, the state of the SIM card is monitored, and the message relating to the state of the SIM card is obtained continuously, and the monitoring way can be that the terminal operating system actively queries, can also be that the terminal operating system passively receives the notification, and can further be a combination of them. By prohibiting the issuance of the abnormal message, the user still maintains the experience that the state of the SIM card is normal, which avoids the problem that the abnormal state of the SIM card is known by the user because of the issuance of the message that the state of the SIM card is abnormal and thus the user experience is affected.

In some embodiments, the state of the SIM card includes a state that the SIM card is in a card slot; and step S121 includes: prohibiting record of a SIM card drop message and prohibiting notification of the SIM card drop message to a status bar when it is monitored that the SIM card is dropped.

In some embodiments, after the modem crashes, when it is monitored that the SIM card is dropped, that is, the state of the SIM card changes from "in card slot" to "not in card slot", the terminal will simply receive the state change message, and does not record the current SIM card drop and does not notify the state to the status bar, which avoids the problem of bad user experience caused by updating the SIM card state icon in the status bar after the status bar receives the latest SIM card state, and making the user feel that the SIM card is unavailable.

In some embodiments, the state of the SIM card includes a SIM card network state; and step S121 includes: prohibiting notification of a message indicating that the SIM card is in the network but there is no service to a status bar when it is monitored that the SIM card is in the network but there is no service.

In some embodiments, after the modem crashes, when it is monitored that the SIM card is in the network but there is no service, that is, the SIM card is not in the state that the service is available, but is in states of no service, network search, etc., the terminal will simply receive the state message, and does not notify the state to the status bar, which avoids the problem of bad user experience caused by updating to the "no service" state of the SIM card after the status bar receives the latest SIM card state that the SIM card is in the network, and making the user feel that the SIM card is unavailable.

In some embodiments, the state of the SIM card includes a SIM card signal strength state; and step S121 includes: prohibiting notification of an invalid signal strength message to a status bar when the invalid signal strength is monitored.

In some embodiments, after the modem crashes, when the invalid signal strength is monitored, the terminal will simply receive the state message, and does not notify the state to the status bar, which avoids the problem of bad user experience caused by updating the signal icon corresponding to the SIM card after the status bar receives the latest SIM card signal strength, and making the user feel that the SIM card is unavailable.

In some embodiments, as shown in FIG. 2, step S12 includes: step S122, prohibiting prompt of the user being unable to make a call when the user makes a call.

Since the modem crashing results in that the current SIM card is dropped or the SIM card is in the network but there is no service, the SIM card is not allowed to make calls at this time in the related technologies, and the terminal will make a prompt to the user that the call cannot be made, including sound prompts such as busy tone, silent or voice prompts, etc., or text or image prompts such as pop-up boxes, message bubbles, etc. In some embodiments, after the modem crashes, if the user makes a call through a dial plate or voice dialing, etc., the terminal does not prompt the user that the call cannot be made, but allows the current call performs dialing, which avoids that the call by the user is prohibited and thus the experience is affected.

In some embodiments, the message processing method 10 further includes: maintaining the call in a waiting state, not establishing a connection between the call and the modem, and enabling the call to establish a connection with the modem after the modem is restarted successfully.

In some embodiments, the user call is maintained in the waiting state, for example, a dial waiting tone is used to prompt the user that the current call is being dialed, but the call is not established a connection with the modem, and the connection is established and the call is dialed again after the modem is restarted, and at this time, the call in the "waiting state" will be attempted to be sent to the base station through the modem, so as to be redialed. The user maintains a state that a telephone call is made without interrupting the dialing due to the modem crash, and does not perceive that the modem has crashed, such that a normal user experience is maintained.

In some embodiments, step S12 includes: step S123, maintaining a mobile data connection available state, and prohibiting issuance of a mobile data disconnection message.

Since the data connection path is disconnected due to the modem crash, the data connection state will be updated to an unavailable state at this time in the related technologies, and various applications running on the terminal will all monitor the state of the data connection, if the state is an unavailable state, the application generally pops up a "current mobile network is not available" prompt to interrupt the ongoing job of the user. In some embodiments, the mobile data connection available state will not be updated due to the modem crash, and the application will not receive the information indicating that the network connection is unavailable, thereby maintaining the normal running state and maintaining the normal user experience.

In some embodiments, the message processing method 10 further includes: caching a data packet waiting to be uploaded through a mobile data connection, and uploading the data packet through the re-established mobile data connection after the modem is restarted successfully.

When the data path maintains an available state, the application may still attempt to continue sending the data packet to the network through the data path, in some embodiments, these data packets are cached and waiting to be uploaded, and the cache can use data structures such as a cache queue, a cache heap, etc. When the modem is restarted, the mobile data connection will be re-established, and after the mobile data connection is restored, the cached data packets are removed one by one and sent to the network. In some embodiments, the modem crash will not cause the interruption of the ongoing business of the user, which ensures temporary availability of the important business of the user, and the business can continue to run normally after the modem is restarted, which ensures the normal user experience throughout the process.

In some embodiments, the message processing method 10 further includes: determining whether the modem is successfully restarted after the modem crashes for a predetermined time, and notifying a user of the modem crash message if the modem fails to be restarted successfully.

There are many reasons for the modem crash, the modem can resume normal operation by restarting the modem, and when the modem fails to restart, the modem may encounter complicated situations and crash, such as hardware damage or system bugs, it is impossible to resume normal operation by simply restarting. In some embodiments, the upper limit of the time consumed by the modem restart is specified by setting a predetermined time. It takes less time to restart the modem, and the consumed time is less than one minute, usually a few seconds or more than ten seconds, the predetermined time may be set to a modem restart time or longer based on different needs, and the longer the predetermined time, the more times the modem is allowed to restart. If the duration of the modem crash exceeds the predetermined time, the user is notified of the modem crash message, and various services and applications of the terminal are also respond to the modem crash, such that the user's usage experience is interrupted, thereby prompting the user to take other methods to solve the crash problem so as to avoid that the issuance of the modem crash message is prohibited for a long time and thus the modem crash cannot be resolved.

Figure 3:
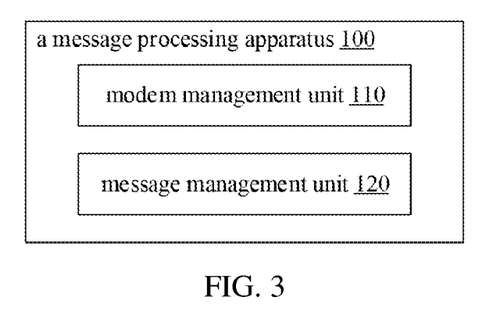
FIG. 3 is a schematic block diagram illustrating a message processing apparatus according to some embodiments.

Based on the similar inventive concept, FIG. 3 shows a message processing apparatus 100, which is applied to a terminal device including a modem, and the apparatus includes a modem management unit 110 configured to monitor a running state of the modem and restart the modem when it is monitored that the modem crashes, and a message management unit 120 configured to maintain a communication connection state and prohibit notification of the modem crash message to a user.

Figure 4:
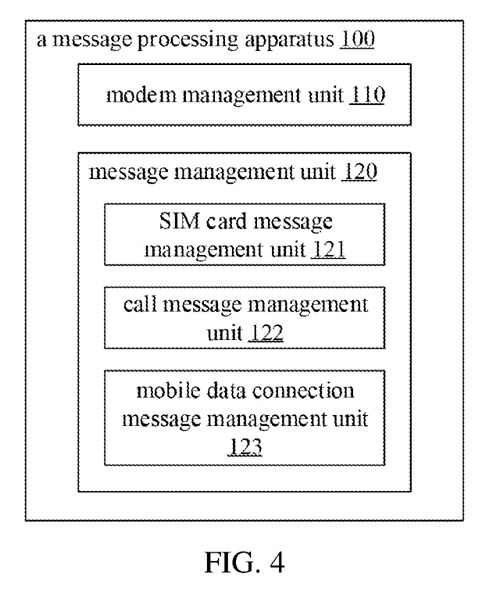
FIG. 4 is a schematic block diagram illustrating another message processing apparatus according to some embodiments.

In some embodiments, as shown in FIG. 4, the message management unit 120 includes a SIM card message management unit 121 configured to monitor a state of a SIM card, and prohibit issuance of a SIM card abnormal message when it is monitored that the SIM card is abnormal.

In some embodiments, the state of the SIM card includes a state that the SIM card is in a card slot; and the SIM card message management unit 121 is configured to: prohibit record of a SIM card drop message and prohibit notification of the SIM card drop message to a status bar, when it is monitored that the SIM card is dropped.

In some embodiments, the state of the SIM card includes a SIM card network state; and the SIM card message management unit 121 is configured to: prohibit notification of a message indicating that the SIM card is in the network but there is no service to a status bar, when it is monitored that the SIM card is in the network but there is no service.

In some embodiments, the state of the SIM card includes a SIM card signal strength state; and the SIM card message management unit 121 is configured to: prohibit notification of an invalid signal strength message to a status bar, when the invalid signal strength is monitored.

In some embodiments, the message management unit 120 includes: a call message management unit 122 configured to prohibit prompt of the user being unable to make a call when the user makes a call.

In some embodiments, the call message management unit 122 is further configured to: maintain the call in a waiting state, not establish a connection between the call and the modem, and enable the call to establish a connection with the modem after the modem is restarted successfully.

In some embodiments, the message management unit 120 includes: a mobile data connection message management unit 123 configured to maintain a mobile data connection available state, and prohibit issuance of a mobile data disconnection message.

In some embodiments, the mobile data connection message management unit 123 is further configured to: cache a data packet waiting to be uploaded through a mobile data connection, and upload the data packet through the re-established mobile data connection after the modem is restarted successfully.

In some embodiments, the message management unit 120 is further configured to: determine whether the modem is successfully restarted after the modem crashes for a predetermined time, and notifying a user of the modem crash message if the modem fails to be restarted successfully.

With respect to the message processing apparatus 100 in the above embodiments, the specific manners for performing operations of individual modules therein have been described in detail in the embodiments regarding the methods, which will not be elaborated herein.

Figure 5:
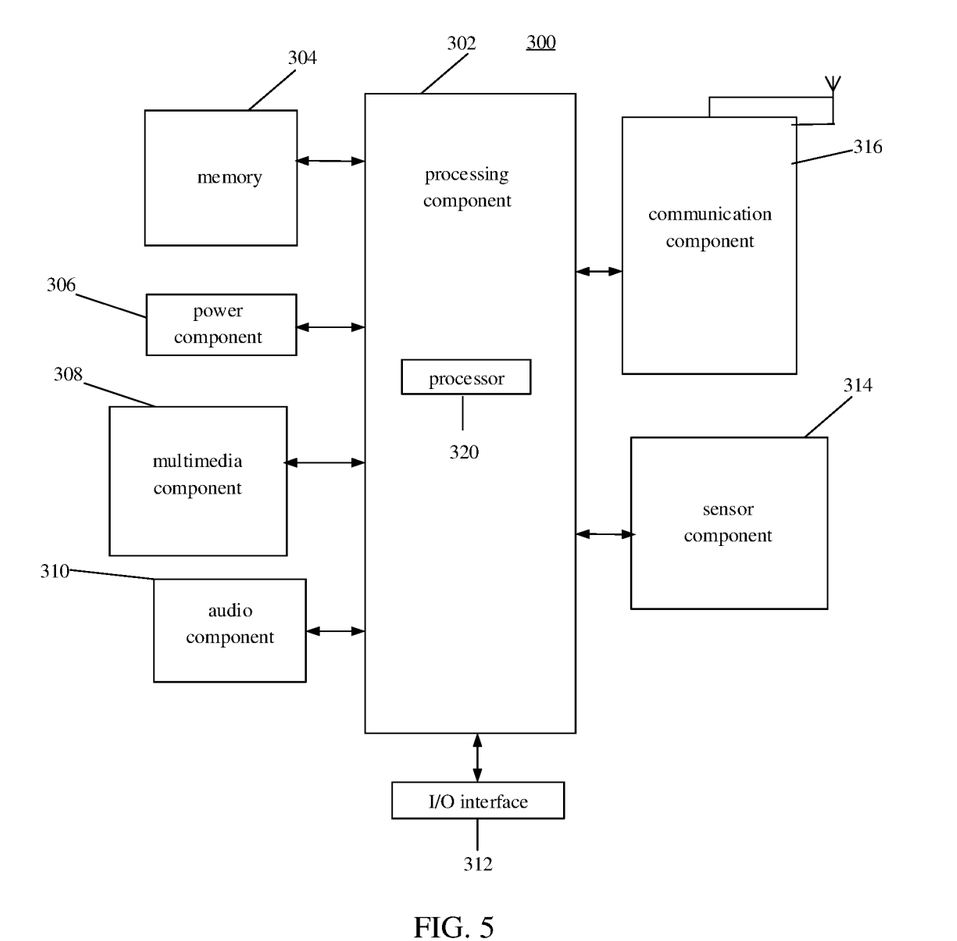
FIG. 5 is a schematic block diagram illustrating a device according to some embodiments.

FIG. 5 is a schematic block diagram of a device of any one of the foregoing embodiments, according to some embodiments. For example, the device 300 can be a mobile phone, a computer, a digital broadcast terminal, a messaging device, a gaming console, a tablet, a medical device, exercise equipment, a personal digital assistant, and the like.

Referring to FIG. 5, the device 300 may include one or more of the following components: a processing component 302, a memory 304, a power component 306, a multimedia component 308, an audio component 310, an input/output (I/O) interface 312, a sensor component 314, and a communication component 316.

The processing component 302 typically controls overall operations of the device 300, such as the operations associated with display, telephone calls, data communications, camera operations, and recording operations. The processing component 302 may include one or more processors 320 to execute instructions to implement all or part of the steps in the above described methods. Moreover, the processing component 302 may include one or more modules which facilitate the interaction between the processing component 302 and other components. For instance, the processing component 302 may include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, videos, etc. The memory 304 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 306 supplies power to various components of the device 300. The power component 306 may include a power management system, one or more power sources, and any other components associated with the generation, management, and distribution of power in the device 300.

The multimedia component 308 includes a screen providing an output interface between the device 300 and a user.

In some embodiments, the screen may include a liquid crystal display (LCD) and a touch panel (TP). In some embodiments, organic light-emitting diode (OLED) displays can be employed.

If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 308 includes a front camera and/or a rear camera. The front camera and/or the rear camera can receive external multimedia data while the device 300 is in an operation mode, such as a photographing mode or a video mode. Each of the front camera and the rear camera may be a fixed optical lens system or have focus and optical zoom capability. In some embodiments, organic light-emitting diode (OLED) or other types of displays can be employed.

The audio component 310 is configured to output and/or input audio signals. For example, the audio component 310 includes a microphone ("MIC") configured to receive an external audio signal when the device 300 is in an operation mode, such as a call mode, a recording mode, and a voice recognition mode. The received audio signal can be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors to provide status assessments of various aspects of the device 300. For instance, the sensor component 314 can detect an on/off status of the device 300, relative positioning of components, e.g., the display and a keypad, of the device 300, the sensor component 314 can also detect a change in position of the device 300 or one component of the device 300, a presence or absence of user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may also include a light sensor, such as a CMOS or CCD image sensor, for use in imaging applications. In some embodiments, the sensor component 314 can also include an accelerometer sensor, a gyroscope sensor, a magnetic sensor, a pressure sensor, or a temperature sensor.

The communication component 316 is configured to facilitate wired or wireless communication between the device 300 and other devices. The device 300 can access a wireless network based on a communication standard, such as Wi-Fi, 2G, 3G, 4G, or 5G, or a combination thereof. In one exemplary embodiment, the communication component 316 receives a broadcast signal or broadcast associated information from an external broadcast management system via a broadcast channel. In one exemplary embodiment, the communication component 316 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the device 300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a computer-readable storage medium including instructions, such as the memory 304 including the instructions executable by the processor 320 in the device 300, for performing the above-described methods. For example, the computer-readable storage medium can be a ROM, a random access memory (RAM), a CD-ROM, a magnetic tape, a floppy disc, an optical data storage device, and the like.

Figure 6:
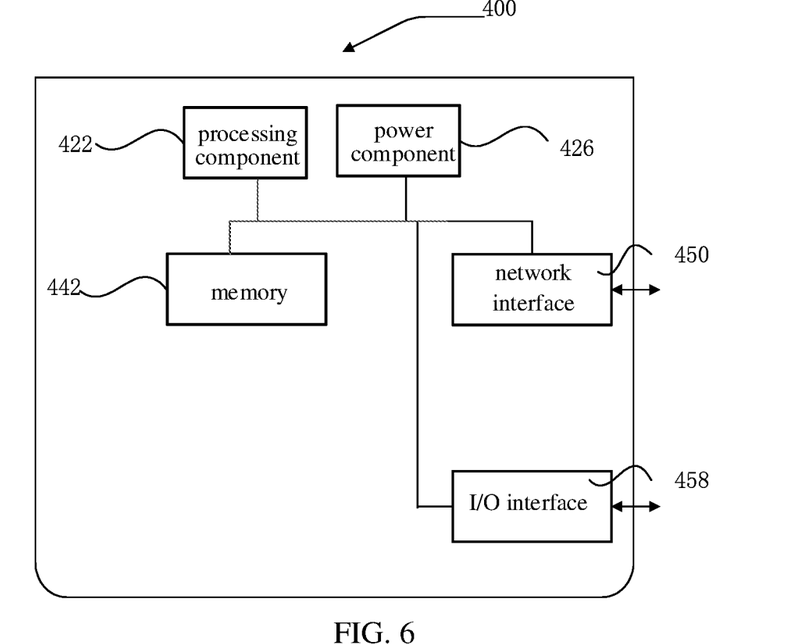
FIG. 6 is a schematic block diagram illustrating an electric device according to some embodiments.

FIG. 6 is a block diagram illustrating an electronic device 400 according to some embodiments. For example, the electronic device 400 may be provided as a server. Referring to FIG. 6, the electronic device 400 includes a processing component 422, which further includes one or more processors, and memory resources represented by a memory 442, for storing instructions executable by the processing component 422, such as application programs. The application program stored in the memory 442 may include one or more modules each corresponding to a set of instructions. In addition, the processing component 422 is configured to execute instructions to perform the above method.

The electronic device 400 may also include a power component 426 configured to perform power management of the device 300, a wired or wireless network interface 450 configured to connect the electronic device 400 to the network, and an input/output (I/O) interface 458. The electronic device 400 can perform an operation based on an operating system stored in the memory 442, such as Windows Server™ Mac OS X™, Unix™, Linux™, FreeBSD™, or the like.

Various embodiments of the present disclosure can have one or more of the following advantages.

By maintaining the normal communication state after the modem crashes, it can be ensured that the user continues to use the various services of the terminal normally to avoid the interruption of the ongoing business of the user; and the terminal resumes normal operation after the modem is restarted, and the user does not perceive that the modem has ever crashed, thereby maintaining the experience of using the terminal normally all the time.

The various circuits, device components, units, blocks, or portions may have modular configurations, or are composed of discrete components, but nonetheless can be referred to as "units," "modules," or "portions" in general. In other words, the "circuits," "components," "modules," "blocks," "portions," or "units" referred to herein may or may not be in modular forms, and these phrases may be interchangeably used.

It will be understood that the "plurality" in the disclosure means two or more, and other quantifiers are similar. "And/or" describes the relationship of the related objects, indicating that there may be three relationships, for example, A and/or B may indicate three cases: A exists alone, A and B exist simultaneously, and B exists alone. The character "/" generally indicates that the relationship between the contextually relevant objects is a "or" relationship. The singular forms "a," "an," and "the" are also intended to include the plural forms unless the context clearly indicates otherwise.

It will be further understood that although the terms such as "first," "second," and the like are used to describe various information, this information should not be limited by these terms. The terms are only used to distinguish the same type of information from each other, and do not indicate a specific order or importance. In fact, the expressions such as "first," "second" and the like can be used interchangeably. For instance, first information can also be referred to as second information without departing from the scope of the disclosure, and similarly, the second information can also be referred to as the first information.

It will be further understood that although the operations in the embodiments of the present disclosure are described in a specific order in the drawings, it will not be understood as requiring that the operations are performed in the specific order shown or in a serial order, or that perform all the operations shown to acquire the desired result. In certain environments, multitasking and parallel processing may be advantageous.

Those of ordinary skill in the art will understand that the above described modules/units can each be implemented by hardware, or software, or a combination of hardware and software. Those of ordinary skill in the art will also understand that multiple ones of the above described modules/units may be combined as one module/unit, and each of the above described modules/units may be further divided into a plurality of sub-modules/sub-units.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode) display, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the audio processing device, to perform various operations.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features may be described above as acting in certain combinations and even initially claimed as such, one or more features from a claimed combination can in some cases be excised from the combination, and the claimed combination may be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A message processing method, applied to a terminal device having a modem, the method comprising:
monitoring a running state of the modem, and restarting the modem when it is detected that the modem crashes; and
maintaining a normal communication connection state after the modem crashes, and prohibiting notification of a modem crash message to a user by:
monitoring a state of a SIM card, and prohibiting issuance of a SIM card abnormal message when it is monitored that the SIM card is abnormal;
wherein
the state of the SIM card comprises a state that the SIM card is in a card slot; and
the prohibiting issuance of a SIM card abnormal message when it is monitored that the SIM card is abnormal comprises:
prohibiting record of a SIM card drop message and prohibiting notification of the SIM card drop message to a status bar when it is monitored that the SIM card is dropped.

2. The message processing method according to claim 1, wherein the state of the SIM card comprises a SIM card network state; and
the prohibiting issuance of a SIM card abnormal message when it is monitored that the SIM card is abnormal comprises:
prohibiting notification of a message indicating that the SIM card is in the network but there is no service to a status bar when it is monitored that the SIM card is in the network but there is no service.

3. The message processing method according to claim 1, wherein the state of the SIM card comprises a SIM card signal strength state; and
the prohibiting issuance of a SIM card abnormal message when it is monitored that the SIM card is abnormal comprises:
prohibiting notification of an invalid signal strength message to a status bar when the invalid signal strength is monitored.

4. The message processing method according to claim 1, wherein the maintaining a communication connection state, and prohibiting notification of a modem crash message to a user comprises:
prohibiting prompt of the user being unable to make a call when the user makes a call.

5. The message processing method according to claim 4, further comprising:
maintaining the call in a waiting state, not establishing a connection between the call and the modem, and enabling the call to establish a connection with the modem after the modem is restarted successfully.

6. The message processing method according to claim 1, wherein the maintaining a communication connection state, and prohibiting notification of the modem crash message to a user comprises:
maintaining a mobile data connection available state, and prohibiting issuance of a mobile data disconnection message.

7. The message processing method according to claim 6, further comprising:
caching a data packet waiting to be uploaded through a mobile data connection, and uploading the data packet through the re-established mobile data connection after the modem is restarted successfully.

8. The message processing method according to claim 7, further comprising:
determining whether the modem is restarted successfully after the modem crashes for a predetermined time, and notifying a user of the modem crash message if the modem fails to be restarted successfully.

9. A non-transitory computer-readable storage medium stored thereon instructions executed by a processor to implement the message processing method according to claim 1.

10. A mobile terminal implementing the method according to claim 1, wherein the mobile terminal is configured to:
by maintaining the normal communication connection state after the modem crashes, ensure that the user continues to use services of the mobile terminal normally to avoid the interruptions; and
resume normal operation after the modem is restarted, thereby preventing the user from perceiving that the modem has ever crashed.

11. A message processing apparatus, applied to a terminal device comprising a modem, the apparatus comprising:
a memory device configured to store instructions; and
a processor configured to invoke the instructions stored in the memory to execute operations including:
monitoring a running state of the modem and restart the modem when it is monitored that the modem crashes; and
maintaining a communication normal connection state after the modem crashes and prohibiting notification of a modem crash message to a user,
wherein the processor is further configured to:
monitor a state of a SIM card, and prohibit issuance of a SIM card abnormal message when it is monitored that the SIM card is abnormal; and
wherein the state of the SIM card comprises a state that the SIM card is in a card slot; and
the processor is further configured to prohibit record of a SIM card drop message and prohibit notification of the SIM card drop message to a status bar when it is monitored that the SIM card is dropped.

12. The message processing apparatus according to claim 11, wherein the state of the SIM card comprises a SIM card network state; and
the processor is further configured to prohibit notification of a message indicating that the SIM card is in the network but there is no service to a status bar when it is monitored that the SIM card is in the network but there is no service.

13. The message processing apparatus according to claim 11, wherein the state of the SIM card comprises a SIM card signal strength state; and
the processor is further configured to prohibit notification of an invalid signal strength message to a status bar when the invalid signal strength is monitored.

14. The message processing apparatus according to claim 11, wherein the processor is further configured to:
prohibit prompt of the user being unable to make a call when the user makes a call.

15. The message processing apparatus according to claim 14, wherein the processor is further configured to:
maintain the call in a waiting state, not establish a connection between the call and the modem, and enable the call to establish a connection with the modem after the modem is restarted successfully.

16. The message processing apparatus according to claim 11, wherein the processor is further configured to:
maintain a mobile data connection available state, and prohibit issuance of a mobile data disconnection message; and
cache a data packet waiting to be uploaded through a mobile data connection, and upload the data packet through the re-established mobile data connection after the modem is restarted successfully.

* * * * *